(12) United States Patent
Clark

(10) Patent No.: US 7,203,778 B2
(45) Date of Patent: *Apr. 10, 2007

(54) METHOD AND SYSTEM FOR NOTIFYING CLIENTS OF A SPECIFIC CHANGE IN A DATA PROCESSING SYSTEM

(75) Inventor: Thomas C. Clark, San Jose, CA (US)

(73) Assignee: Apple Inc., Cupertino, CA (US)

( * ) Notice: Subject to any disclaimer, the term of this patent is extended or adjusted under 35 U.S.C. 154(b) by 215 days.

This patent is subject to a terminal disclaimer.

(21) Appl. No.: 10/944,100

(22) Filed: Sep. 17, 2004

(65) Prior Publication Data

US 2005/0177651 A1    Aug. 11, 2005

Related U.S. Application Data

(63) Continuation of application No. 09/305,815, filed on May 4, 1999, now Pat. No. 6,925,513.

(51) Int. Cl.
*G06F 13/00* (2006.01)
*G06F 9/00* (2006.01)
*G06F 3/00* (2006.01)

(52) U.S. Cl. .................. 710/104; 710/302; 710/19; 713/1; 713/100; 709/203; 719/318

(58) Field of Classification Search ........ 710/300–304, 710/104, 8–19; 713/1, 2, 100; 709/203, 709/223; 719/318
See application file for complete search history.

(56) References Cited

U.S. PATENT DOCUMENTS

| | | | | |
|---|---|---|---|---|
| 5,109,486 A | * | 4/1992 | Seymour | 709/224 |
| 5,133,075 A | * | 7/1992 | Risch | 707/201 |
| 5,263,080 A | * | 11/1993 | Jones et al. | 379/88.19 |
| 5,485,617 A | * | 1/1996 | Stutz et al. | 709/315 |
| 5,519,851 A | * | 5/1996 | Bender et al. | 710/301 |
| 5,532,945 A | * | 7/1996 | Robinson | 365/226 |
| 5,537,597 A | * | 7/1996 | Sandage | 395/712 |
| 5,566,337 A | * | 10/1996 | Szymanski et al. | 710/260 |
| 5,655,081 A | * | 8/1997 | Bonnell et al. | 709/202 |
| 5,805,886 A | * | 9/1998 | Skarbo et al. | 709/318 |
| 5,826,253 A | * | 10/1998 | Bredenberg | 707/2 |
| 5,828,899 A | * | 10/1998 | Richard et al. | 710/8 |
| 5,949,979 A | * | 9/1999 | Snow et al. | 710/302 |
| 5,974,541 A | * | 10/1999 | Hall et al. | 709/108 |
| 6,038,625 A | * | 3/2000 | Ogino et al. | 710/104 |
| 6,055,595 A | * | 4/2000 | Tachibana et al. | 710/102 |
| 6,112,228 A | * | 8/2000 | Earl et al. | 709/205 |

(Continued)

OTHER PUBLICATIONS

"Autonomous transaction processing using data dependency in mobile environments" by Young et al. (abstract only) Publication Date: May 28-30, 2003.*

(Continued)

*Primary Examiner*—Gopal C. Ray
(74) *Attorney, Agent, or Firm*—Blakely, Sokoloff, Taylor & Zafman LLP

(57) ABSTRACT

A method of notifying clients of a change in a USB including a first client requesting notification of a first change in the USB, detecting the first change in the USB, and notifying the first client requesting notification that the first change in the USB occurred.

20 Claims, 5 Drawing Sheets

U.S. PATENT DOCUMENTS

| | | | |
|---|---|---|---|
| 6,115,646 A * | 9/2000 | Fiszman et al. | 700/181 |
| 6,115,743 A * | 9/2000 | Cowan et al. | 709/224 |
| 6,131,134 A * | 10/2000 | Huang et al. | 710/302 |
| 6,160,796 A * | 12/2000 | Zou | 370/257 |
| 6,163,795 A * | 12/2000 | Kikinis | 709/203 |
| 6,216,188 B1 * | 4/2001 | Endo et al. | 710/302 |
| 6,253,195 B1 * | 6/2001 | Hudis et al. | 707/2 |
| 6,266,716 B1 * | 7/2001 | Wilson et al. | 710/33 |
| 6,282,568 B1 * | 8/2001 | Sondur et al. | 709/223 |
| 6,297,794 B1 * | 10/2001 | Tsubouchi et al. | 345/204 |
| 6,311,242 B1 * | 10/2001 | Falkenburg et al. | 345/503 |
| 6,360,331 B2 * | 3/2002 | Vert et al. | 714/4 |
| 6,366,926 B1 * | 4/2002 | Pohlmann et al. | 707/104.1 |
| 6,401,157 B1 * | 6/2002 | Nguyen et al. | 710/302 |
| 6,477,573 B1 * | 11/2002 | Lea | 709/224 |
| 6,487,623 B1 * | 11/2002 | Emerson et al. | 710/302 |
| 6,567,875 B1 * | 5/2003 | Williams et al. | 710/302 |
| 6,578,006 B1 * | 6/2003 | Saito et al. | 705/9 |
| 6,925,513 B1 * | 8/2005 | Clark | 710/104 |
| 2002/0083003 A1 * | 6/2002 | Halliday et al. | 705/52 |
| 2002/0120703 A1 * | 8/2002 | Kaufman et al. | 709/207 |
| 2003/0177246 A1 * | 9/2003 | Goodman et al. | 709/228 |
| 2003/0225870 A1 * | 12/2003 | Sandadi et al. | 709/223 |
| 2004/0181591 A1 * | 9/2004 | Yu et al. | 709/217 |
| 2005/0177651 A1 * | 8/2005 | Clark | 710/8 |

OTHER PUBLICATIONS

"Universal Serial Bus Specification", Revision 1.0, Jan. 15, 1996.

* cited by examiner

METHOD AND SYSTEM FOR NOTIFYING CLIENTS OF A SPECIFIC CHANGE IN A DATA PROCESSING SYSTEM

This application is a continuation application of U.S. patent application Ser. No. 09/305,815, filed May 4, 1999, now U.S. Pat. No. 6,925,513.

BACKGROUND OF THE INVENTION

1. Field of the Invention

The invention relates generally to communication in information processing systems and more specifically to notifying parts of systems that changes in other parts of the system have occurred.

2. Description of the Related Art

A recent advance in the design of computers involves hot-pluggability, the ability to connect a device to a computer bus while the computer is operating, and have that device communicate properly with the computer. In the past, computers could only be reliably connected to devices when power was not supplied. Now, busses have been designed which function properly when devices are connected or powered-up after the bus has power.

Unfortunately, solving the electrical problems associated with hot-pluggability does not guarantee that the device will communicate with the computer. The computer must be made aware that the device has been connected, and must be made aware of how that device communicates. This problem is typically solved either by having the computer poll the newly connected device for this information, or by having the newly connected device announce its presence.

Even this does not solve all problems involved with connecting a device to a computer after the computer starts operating. Clients, such as application programs and other routines may be established on the computer, as background processes, foreground processes, or as quiescent routines awaiting activation. If these clients have already determined which devices are connected before the newly connected device is connected to the bus, the clients may not be able to take advantage of the presence of the newly connected device. Therefore, what is needed is a method or apparatus for notifying clients of the presence of the newly connected device. Furthermore, not all application programs or routines may want to know of specific devices being connected, so what is also needed is a method or apparatus for selectively notifying clients of the presence of newly connected devices.

SUMMARY OF THE INVENTION

The present invention, in one embodiment, is a method of notifying clients of a change in a system including a client requesting notification of a change in the system, detecting the change in the system, and notifying the client requesting notification that the change in the system occurred. The present invention may further include maintaining a list of requests for notification and removing requests for notification when a client terminates a request for notification.

The invention, in an alternate embodiment, is a subsystem for notifying clients of a change in a system including means for a client to request notification of the change in the system, means for detecting the change in the system, and means for notifying the client requesting notification that the change in the system occurred.

The present invention may be implemented in a system including a processor and memory. Likewise, the present invention may be embodied in instructions encoded in a computer readable medium. Furthermore, the present invention may be practiced in a system employing a USB.

BRIEF DESCRIPTION OF THE DRAWINGS

The present invention is illustrated by way of example and not limitation in the accompanying figures.

FIG. 1b illustrates an alternate conception of the system of FIG. 1a.

DETAILED DESCRIPTION

A method and apparatus for USB Device Notification is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1A:
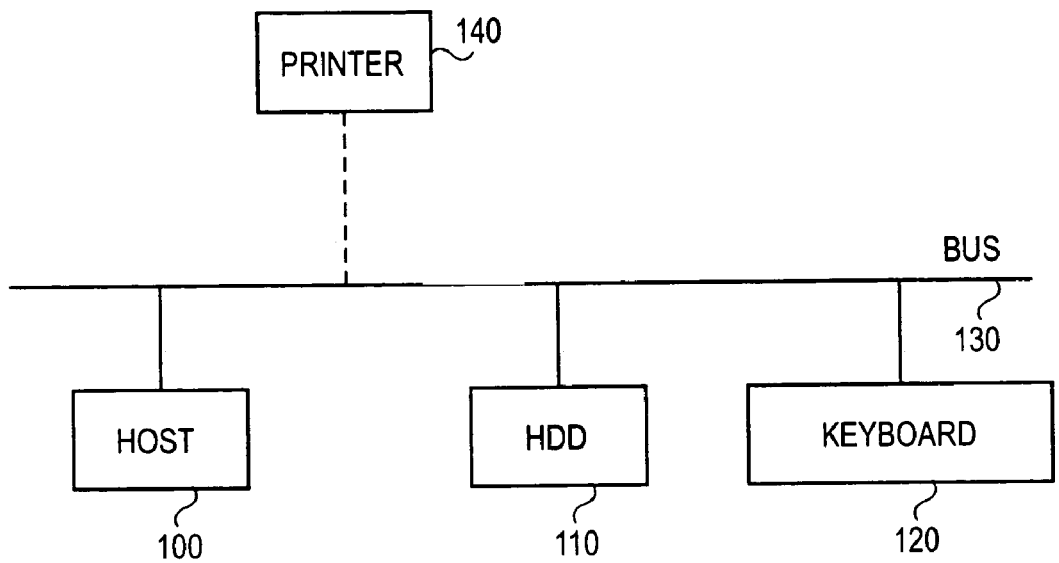
FIG. 1a illustrates a system suitable for use with the present invention.
Figure 1B:
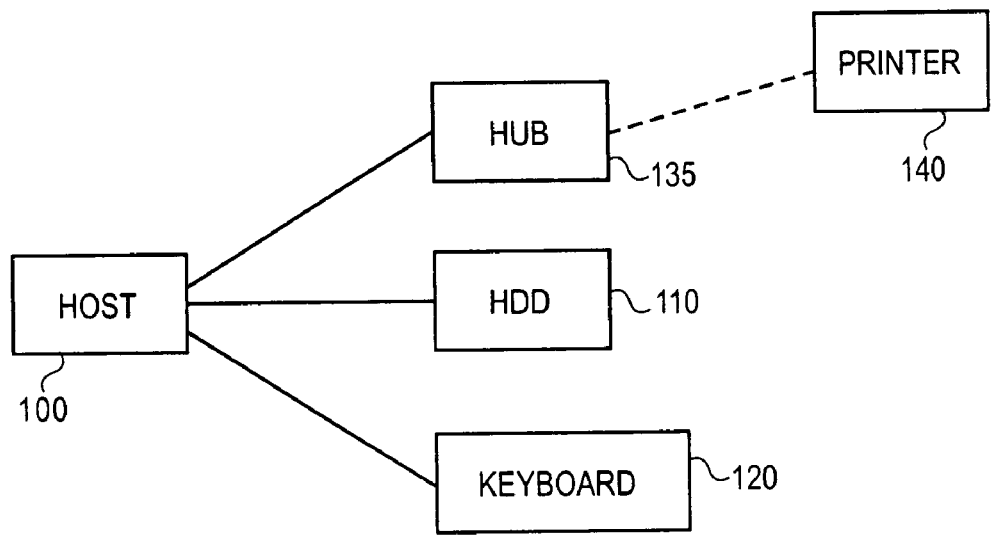

FIG. 1a illustrates a system suitable for use with the present invention. The system includes Host 100, HDD (Hard Disk Drive) 110, Keyboard 120, all connected to Bus 130. Additionally, Printer 140 may be connected to Bus 130, thereby allowing communication between Host 100 and Printer 140. FIG. 1b illustrates an alternate conception of the system of FIG. 1a. Here, the connections are formed with a star topology as typically used when making connections via the Universal Serial Bus (USB). There is a direct connection between Host 100 and Keyboard 120, between Host 100 and HDD 110, and between Host 100 and Hub 135. Printer 140 is optionally connected to Hub 135. In this example, the connections between the devices are the physical connections that substitute for the logical Bus 130. Further information on the USB may be obtained by consulting the USB Specification 1.0, Jan. 15, 1996, which document is hereby incorporated by reference.

Host 100 may be a computer or other processing apparatus suitable for connection to peripheral devices. If a computer, Host 100 includes a microprocessor and may also include some form of internal storage. However, Host 100 may be a controller which serves as a gateway for signals to and from the devices connected thereto.

Figure 2:
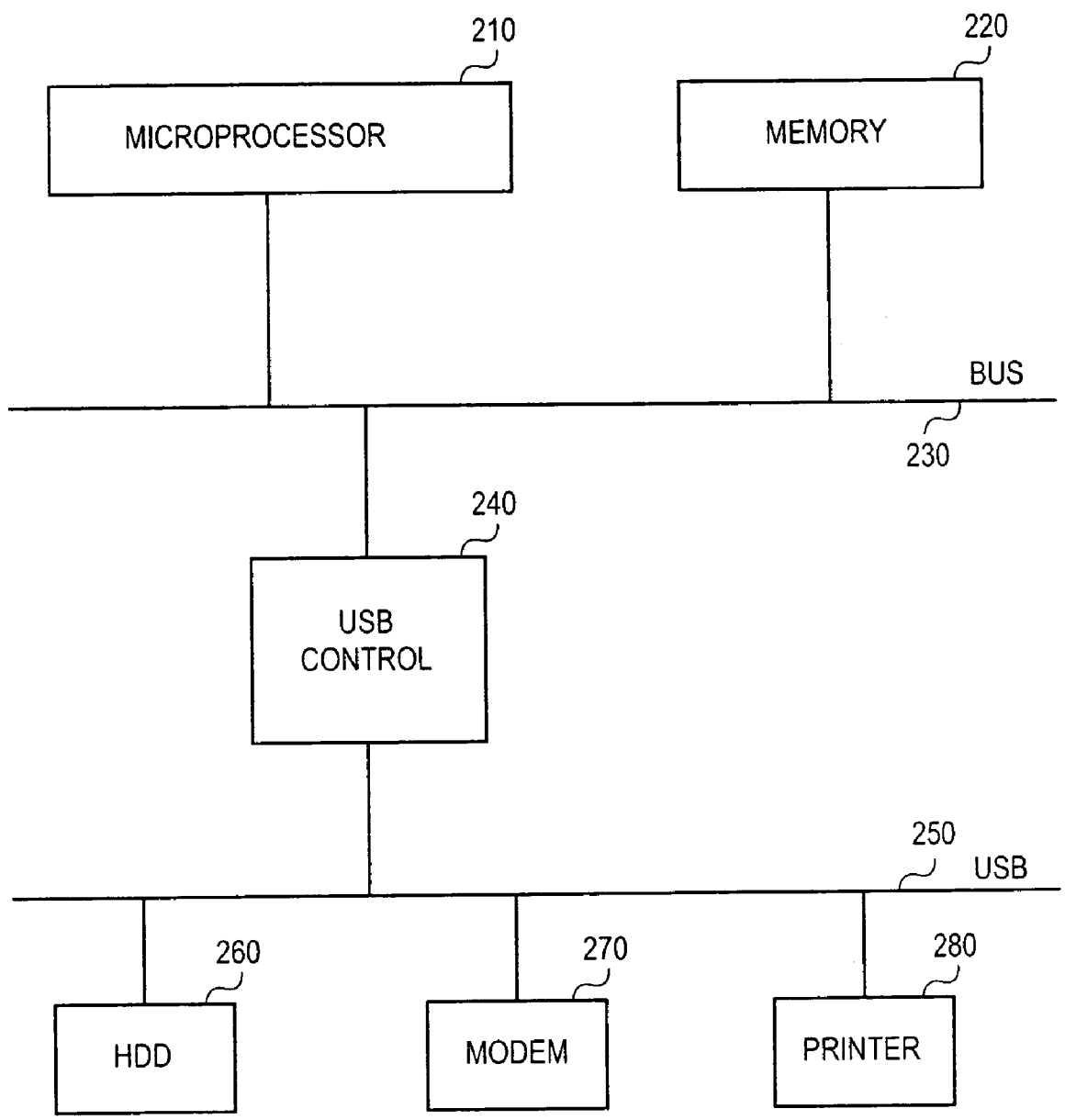
FIG. 2 illustrates another system suitable for use with the present invention.

FIG. 2 illustrates another system suitable for use with the present invention. Microprocessor 210 is coupled to Bus 230, which is coupled to both Memory 220 and USB Control 240. USB Control 240 is coupled to HDD 260, Modem 270 and Printer 280 through USB 250. In a typical USB implementation, USB Control 240 is a control hub that is directly connected to each of HDD 260, Modem 270, and Printer 280. Since the USB allows for hot insertion and removal, Modem 270 may be connected to USB Control 240 after Microprocessor 210 is powered, or Modem 270 may be disconnected from USB Control 240 while Microprocessor 210 is still powered.

Microprocessor 210 communicates with each of the devices coupled to USB Control 240, so Microprocessor 210 must be kept apprised of what is connected to USB Control 240. Otherwise, Microprocessor 210 may attempt to send instructions to Modem 270 after Modem 270 has been disconnected from USB Control 240. Likewise, Microprocessor 210 may need to access HDD 260. If HDD 260 was not connected to USB Control 240 when Microprocessor 210 initially sought access to HDD 260, Microprocessor 210 may fail to complete its processing due to its inability to access HDD 260.

As mentioned above, Host 100 may be a computer or other processing apparatus suitable for connection to peripheral devices. In one embodiment, Host 100 includes Microprocessor 210, Memory 220, Bus 230 and USB Control 240. Microprocessor 210 may be a processor such as those manufactured by Motorola or Intel. Memory 220 may be dynamic random access memory (DRAM), and may also include static RAM or ROM of some form. Note that Memory 220, Microprocessor 210 and Bus 230 may be incorporated on a single device, or each may be composed of several individual devices. Typically, Host 100 also includes some form of input device, such as a keyboard, pointing device, or scanner, and some form of output device, such as a display or speaker. Host 100 may also be connected to input devices such as cameras, storage media, or microphones, and may also be connected to output devices such as printers or storage media. Host 100 may further be connected to such input/output devices as modems or touch-sensitive screens, too. Storage media (machine-readable media) may include magnetic disks, carrier waves, optical disks, magnetic tape, memory as described with regard to Memory 220 above, and other forms of media suitable for storage of information.

It will be appreciated that Host 100 may take on other forms, such as a network computer or intelligent appliance. Typically, Host 100 will be controlled by an operating system, such as MacOS available from Apple Computer Corp. of Cupertino, Calif., the Linux operating system, or Windows '95 available from Microsoft Corporation of Redmond, Wash. Under control of such an operating system, Host 100 will execute programs such as application programs. Likewise, the operating system will include routines. These routines and programs will, at times, access peripheral devices coupled to Host 100. When these routines and programs access these peripheral devices, adequate information on which peripheral devices are currently coupled to Host 100 and what other changes have occurred in the system is essential.

Figure 3:
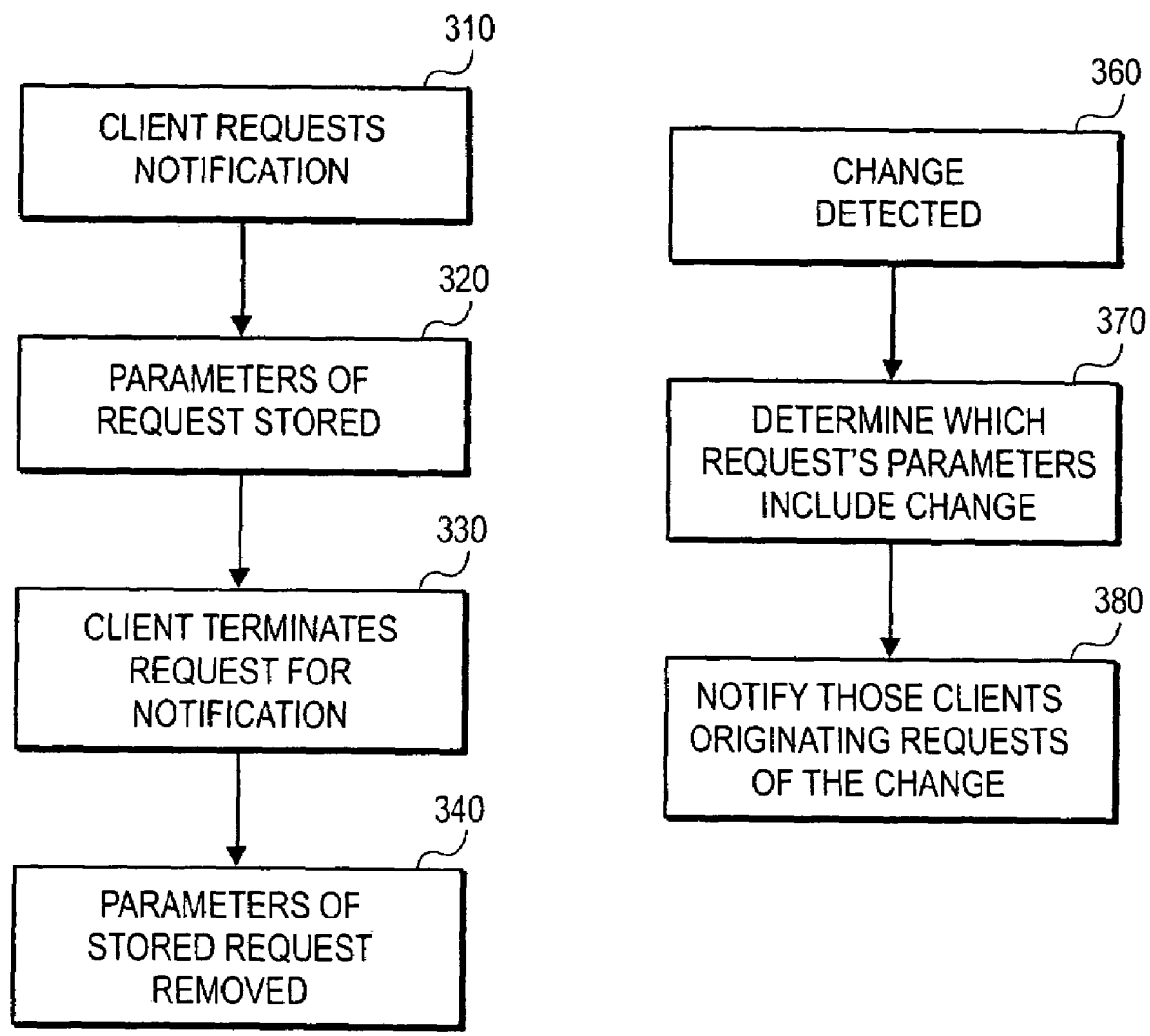
FIG. 3 illustrates a process followed in the practice of one embodiment of the present invention.

These routines and programs may be thought of as clients for purposes of discussion. A method of informing these clients of what changes have occurred in the system will now be explained. FIG. 3 illustrates a process followed in the practice of one embodiment of the present invention, whereby the clients are notified of changes in the system. First, a client requests notification of certain changes in Request Entry 310. As a result of that request, Parameter Storage 320 occurs, storing parameters of the request submitted by the client. Later, the client may no longer need information on changes, and therefore will terminate the previous request for notification at Request Termination 330.

As a result of the termination, Parameter Removal 340 occurs, and the parameters stored relating to the terminated request are removed. Requests may, in one embodiment, be submitted to a Device Notification routine, which will then either store or remove the parameters of the requests as appropriate.

Simultaneous with the operation on requests, the Device Notification routine will also determine whether changes are occurring in the system. When a change is detected as in Change Detection 360, the Device Notification routine acts upon that change. In Determination 370, the Device Notification routine will determine which requests have parameters that include the change detected in Change Detection 360. The Device Notification routine will then proceed to Notification 380, that is notifying each client that submitted a request with parameters that include the detected change. Both cycles Request Entry 310 through Parameter Removal 340 and Change Detection 360 through Notification 380 proceed independently of each other.

Figure 4:
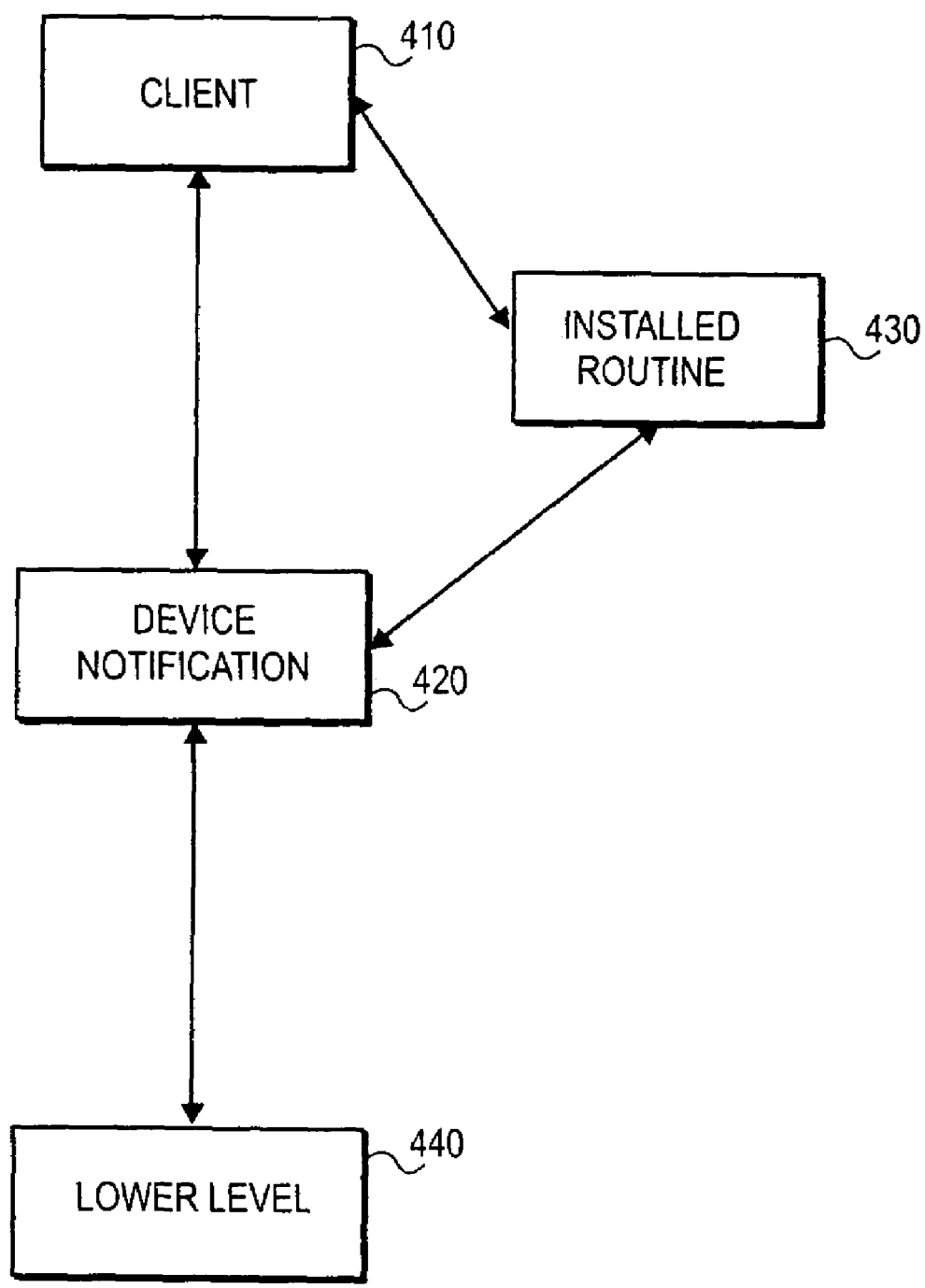
FIG. 4 illustrates one representation of communication that may occur in practicing the present invention.

FIG. 4 illustrates one representation of communication that may occur in practicing the present invention. Client 410 communicates with Device Notification routine 420, such as through requests for notification and termination of these requests. These requests may, in one embodiment, include an Installed Routine 430, which Device Notification 420 may activate in order to notify Client 410 of a detected change. Such an Installed Routine 430 may communicate with both Client 410 and Device Notification routine 420. Device Notification 420 communicates with Lower Level 440 to detect changes in the system, and then compares those changes with the requests for notification received from Client 410 to determine whether Client 410 needs notification of the detected changes. Lower Level 440 may be a part of an operating system, implemented in either hardware, software, or firmware. Alternatively, Lower Level 440 may be a physical device such as USB Control 240. Changes in the system may include connection or disconnection of a device such as a printer, errors in interfacing or communicating with a device, or a device being busy due to previous activity.

In one embodiment, utilized in implementing the present invention in conjunction with the MacOS operating system available from Apple Computer, Corp. of Cupertino, Calif., communication between a Client and a Device Notification routine occurs when the Client calls a USBInstallDeviceNotification function. Such a function call serves as a request for notification. A call to such a function looks like:

```
void USBInstallDeviceNotification(
    USBDeviceNotificationParameterBlock *pb);
pb      A pointer to the USBDeviceNotificationParameterblock
```

The USBDeviceNotificationParameterblock includes information on what types of changes the Client wants notification of and what routine (Installed Routine) to use to communicate with the Client. The USBDeviceNotificationParameterblock is defined as:

```
/* Device Notification Parameter Block */
struct USBDeviceNotificationParameterBlock
(
UInt16                          pbLength;
UInt16                          pbVersion;
```

-continued

```
USBNotificationType            usbDeviceNotification
UInt8                          reserved1;
USBDeviceRef                   usbDeviceRef;
UInt16                         usbClass;
UInt16                         usbSubClass;
UInt16                         usbProtocol;
UInt16                         usbVendor
UInt16                         usbProduct
OSStatus                       result;
UInt32                         token;
USBDeviceNotificationCallbackProcPtr  callback;
UInt32                         refcon;
};
```

Field Descriptions

| | | |
|---|---|---|
| <--> | usbDeviceNotification | The type of notification<br>The following notifications are defined:<br>kNotifyAnyEvent<br>kNotifyAddDevice<br>kNotifyAddInterface<br>kNotifyRemoveDevice<br>kNotifyRemoveInterface |
| <-- | usbDeviceRef | The device reference for the target device |
| <--> | usbClass | The class of the target device, use kUSBAnyClass for any class |
| <--> | usbSubClass | The Subclass of the target device, use kUSBAnySubclass for any subclass |
| <--> | usbProtocol | The protocol of the target device, use kUSBAnyProtocol for any protocol |
| <--> | usbVendor | The Vendor ID of the target device, use kUSBAnyVendor for any vendor |
| <--> | usbProduct | The product ID of the target device, use kUSBAnyProduct for any product |
| <-- | result | The status of the call |
| <-- | token | The identifier for this notification request |
| --> | callback | A pointer to the callback routine to be called when the notification criteria is satisfied |

Note that and arrow '→' indicates a parameter sent from the Client to the Device Notification routine, and an arrow '←' indicates a parameter sent from the Device Notification routine to the Client. A double-ended arrow '⇆' indicates a parameter communication in both directions. Also, note that the parameters sent from the Cleint to the Device Notification routine specify what type of changes the Client seeks notification of. A first request from a first Client might seek notification of the connection of any printer. A second request, from either a first Client or a second Client, may seek notification of connection of any printer manufactured by a particular ventor, such as Hewlett-Packard. The first request would simply specify a printer as the class of device in the usbClass field. The second request would specify a printer in the usbClass field, and alson specify the vendor Hewlett-Packard in the usbVendor field.

As will be appreciated, requests for notification may be specific or general, and multiple requests may be made by a single Client, such as a Client seeking access to both a modem and a printer. In one embodiment, the Device Notification routine provides notification by calling a callback routine such as the one supplied in the callback field. Such a routine would be declared as:

```
typedef void (USBDeviceNotificationCallbackProc)
    (USBDeviceNotificationParameterBlockPtr pb);
```

```
typedef USBDeviceNotificaitonCallbackProc
    *USBDeviceNotificationCallbackProcPtr;
```

This implementation provides flexibility to the Client, allowing the Client to receive notification of changes in a manner useful to the Client. In particular, the Client may supply a routine as a callback routine which alerts it to the presence of a newly connected device, or it may supply a routine that adds a newly connected device to a list of devices maintained by the Client. Likewise, notification of removal or disconnection of a device may result in calling a different routine supplied in a different request.

Since the Device Notification routine receives multiple requests, it must maintain a list of each request and its associated parameters. Such a list would include the parameters passed to the Device Notification routine when a client calls USBInstallDeviceNotification and a token identifying each request uniquely. However, if a Client such as an application program is terminating, the Client should terminate the request of notification, and it can do this with a call to a USBRemoveDeviceNotification function. Such a function is declared as:

```
OSStatus USBRemoveDeviceNotification (UInt32 token);
token   Notification identifier from the previously installed device
        notification routine.
```

Upon termination of the request, the information relating to that request that is maintained by the Device Notification routine is discarded, and the Device Notification routine no longer seeks to notify the Client in accordance with that request.

Figure 5:
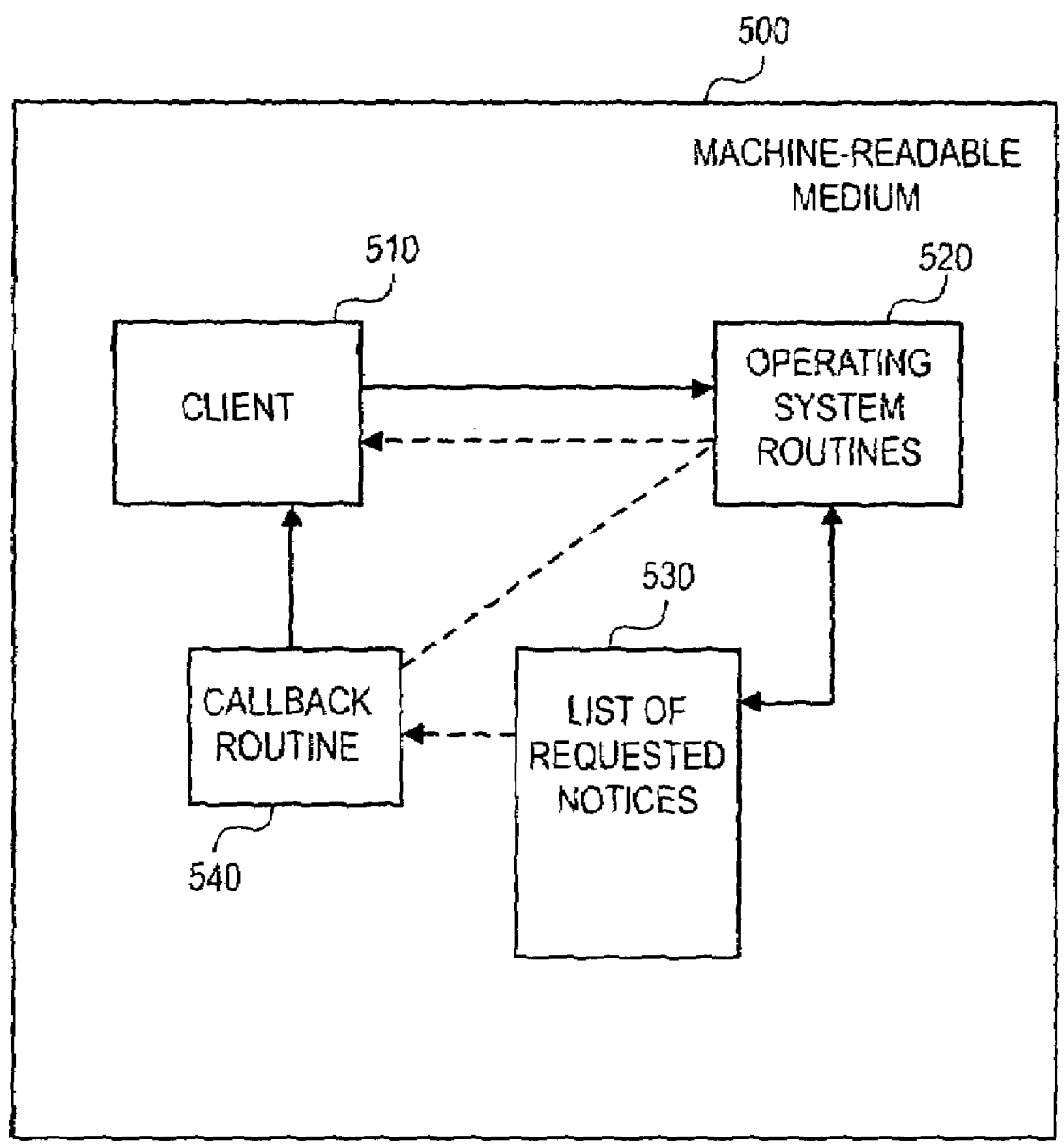
FIG. 5 illustrates an example of a machine-readable medium in accordance with the present invention.

Turning to FIG. 5, an example of a machine-readable medium in accordance with the present invention is illustrated. In one embodiment, Machine-Readable Medium 500 contains Operating System routines 520 embodying Device Notification 420 of FIG. 4, Client 510, the routines that embody Client 410 of FIG. 4, List of Requested Notices 530, and Callback routine 540, embodying Installed Routine 430 of FIG. 4. Client 510 requests notification of changes in the status of the system. Operating System routines 520, such as those in the MacOS operating system available from Apple Computer, Inc. of Cupertino Calif., receive the requests for notification from Client 510, manage the List of Requested Notices 530 which stores the information on each request, detect changes in the status of the system, and call the Callback routine 540 when a status change corresponding to a request is detected or otherwise notify a requestor of the status change. List of Requested Notices 530 includes information on each request, such as that described in the above description of the invention as implemented in the MacOS operating system, and may include a pointer to Callback routine 540 or a similar callback routine for each individual request. Callback routine 540 calls Client 510 or otherwise notifies Client 510 of the change in status, and may be a portion of Client 510.

It will be appreciated that each of the above routines or portions of information may be stored in machine-readable media (or a single medium) in distributed or whole form. In either case, the information will typically be stored in a form suitable for execution (such as executable instructions for example) by a processor such as a microprocessor, or for use during execution by a processor. Additionally, the information, such as the List of Requested Notices 530, may be changed during execution, including creation or deletion of entries or creation or deletion of the entire List 530. In FIG. 5, the appearance is created that everything is stored in integrated or whole form in a single machine-readable medium, but it will be appreciated that storage in distributed form in one medium or over multiple media does not depart from the spirit of the invention.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method for notifying clients of a specific change in a data processing system, the method comprising:
   in response to a first request from a client for notification of a specific change in the data processing system, adding the first request to a list of requests for notification;
   in response to detecting the specific change in the data processing system, notifying the client originating the first request regarding the specific change, according to one or more parameters of the first request stored in the list of the requests for notification; and
   in response to a second request from the client for terminating notification of the specific change, removing the first request from the list of requests for notification, such that the client is not notified of the specific change subsequently occurring after the removing.

2. The method of claim 1, wherein adding and/or removing the first request is performed in a first cycle and detecting the specific change is performed in a second cycle different than the first cycle.

3. The method of claim 1, wherein the specific change of the data processing system comprises connecting a peripheral device to the data processing system.

4. The method of claim 1, wherein the specific change of the data processing system comprises disconnecting a peripheral device from the data processing system.

5. The method of claim 1, wherein the first request comprises a callback routine of the client, and wherein notifying the client comprises calling the callback routine to notify the client.

6. A machine-readable medium having instructions, when executed by a machine, cause the machine to perform a method for notifying clients of a specific change in a data processing system, the method comprising:
   in response to a first request from a client for notification of a specific change in the data processing system, adding the first request to a list of requests for notification;
   in response to detecting the specific change in the data processing system, notifying the client originating the first request regarding the specific change, according to one or more parameters of the first request stored in the list of the requests for notification; and
   in response to a second request from the client for terminating notification of the specific change, removing the first request from the list of requests for notification, such that the client is not notified of the specific change subsequently occurring after the removing.

7. The machine-readable medium of claim 6, wherein adding and/or removing the first request is performed in a first cycle and detecting the specific change is performed in a second cycle different than the first cycle.

8. The machine-readable medium of claim 6, wherein the specific change of the data processing system comprises connecting a peripheral device to the data processing system.

9. The machine-readable medium of claim 6, wherein the specific change of the data processing system comprises disconnecting a peripheral device from the data processing system.

10. The machine-readable medium of claim 6, wherein the first request comprises a callback routine of the client, and wherein notifying the client comprises calling the callback routine to notify the client.

11. An apparatus for notifying clients of a specific change in a data processing system, the apparatus comprising:
    means for adding, in response to a first request from a client for notification of a specific change in the data processing system, the first request to a list of requests for notification;
    means for notifying, in response to detecting the specific change in the data processing system, the client originating the first request regarding the specific change, according to one or more parameters of the first request stored in the list of the requests for notification; and
    means for removing, in response to a second request from the client for terminating notification of the specific change, the first request from the list of requests for notification, such that the client is not notified of the specific change subsequently occurring after the removing.

12. The apparatus of claim 11, wherein adding and/or removing the first request is performed in a first cycle and detecting the specific change is performed in a second cycle different than the first cycle.

13. The apparatus of claim 11, wherein the specific change of the data processing system comprises connecting a peripheral device to the data processing system.

14. The apparatus of claim 11, wherein the specific change of the data processing system comprises disconnecting a peripheral device from the data processing system.

15. The apparatus of claim 11, wherein the first request comprises a callback routine of the client, and wherein notifying the client comprises calling the callback routine to notify the client.

16. A data processing system, comprising:
    a processor; and
    a memory coupled to the processor for storing instructions, when executed from the memory, cause the processor to perform a method, the method including in response to a first request from a client for notification of a specific change in the data processing system, adding the first request to a list of requests for notification,
    in response to detecting the specific change in the data processing system, notifying the client originating the first request regarding the specific change, according to one or more parameters of the first request stored in the list of the requests for notification, and
    in response to a second request from the client for terminating notification of the specific change, removing the first request from the list of requests for notification, such that the client is not notified of the specific change subsequently occurring after the removing.

17. The system of claim 16, wherein adding and/or removing the first request is performed in a first cycle and detecting the specific change is performed in a second cycle different than the first cycle.

18. The system of claim 16, wherein the specific change of the data processing system comprises connecting a peripheral device to the data processing system.

19. The system of claim 16, wherein the specific change of the data processing system comprises disconnecting a peripheral device from the data processing system.

20. The system of claim 16, wherein the first request comprises a callback routine of the client, and wherein notifying the client comprises calling the callback routine to notify the client.

* * * * *